(12) United States Patent
Back

(10) Patent No.: US 8,696,118 B2
(45) Date of Patent: Apr. 15, 2014

(54) USE OF ACCOMMODATIVE ERROR MEASUREMENTS IN PROVIDING OPHTHALMIC LENSES

(75) Inventor: Arthur Back, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 141 days.

(21) Appl. No.: 13/318,433

(22) PCT Filed: May 3, 2010

(86) PCT No.: PCT/US2010/033393
§ 371 (c)(1),
(2), (4) Date: Jan. 13, 2012

(87) PCT Pub. No.: WO2010/129472
PCT Pub. Date: Nov. 11, 2010

(65) Prior Publication Data
US 2012/0113388 A1    May 10, 2012

Related U.S. Application Data

(60) Provisional application No. 61/175,233, filed on May 4, 2009.

(51) Int. Cl.
*G02C 7/02* (2006.01)
*G02C 7/04* (2006.01)

(52) U.S. Cl.
CPC .............. *G02C 7/027* (2013.01); *G02C 7/024* (2013.01); *G02C 7/04* (2013.01)
USPC ............. 351/159.74; 351/159.78; 351/159.79

(58) Field of Classification Search
CPC ........... G02C 7/024; G02C 7/027; G02C 7/04
USPC ............ 351/159.09, 159.16, 159.23, 159, 78, 351/159.02
See application file for complete search history.

(56) References Cited

U.S. PATENT DOCUMENTS

| | | | |
|---|---|---|---|
| 4,420,228 A * | 12/1983 | Humphrey | .................... 351/212 |
| 5,404,183 A | 4/1995 | Seidner | |
| 5,541,678 A | 7/1996 | Awanohara et al. | |
| 5,875,019 A | 2/1999 | Villani | |
| 6,364,483 B1 | 4/2002 | Grossinger et al. | |
| 6,752,499 B2 | 6/2004 | Aller | |
| 7,025,460 B2 | 4/2006 | Smitth et al. | |
| 7,216,977 B2 | 5/2007 | Poulain et al. | |
| 7,370,962 B2 * | 5/2008 | Roffman et al. | ......... 351/159.41 |
| 7,540,610 B2 | 6/2009 | Carimalo et al. | |
| 7,832,859 B2 * | 11/2010 | Phillips | ...................... 351/159.1 |
| 7,862,171 B2 | 1/2011 | Varnas et al. | |
| 2008/0218687 A1 | 9/2008 | Phillips | |

FOREIGN PATENT DOCUMENTS

| | | |
|---|---|---|
| EP | 2028528 A1 | 2/2009 |
| FR | 2850763 A1 | 8/2004 |
| FR | 2871247 A1 | 12/2005 |
| JP | 2007-511803 | 5/2007 |
| WO | 9726580 A1 | 7/1997 |
| WO | 0163344 A1 | 8/2001 |
| WO | 2005055891 A1 | 6/2005 |
| WO | 2007041796 A1 | 4/2007 |
| WO | 2008-144497 A1 | 11/2008 |
| WO | 2009052570 A1 | 4/2009 |

OTHER PUBLICATIONS

Supplementary Partial European Search Report issued in corresponding European Patent Application No. 10772646 dated May 10, 2012 (6 pages).
Chung et al., "Near esophoria is associated with high myopia," Clinical and Experimental Optometry, vol. 83, No. 2, Mar. 1, 2000, pp. 71-75 (5 pages).
International Search Report and Written Opinion of the International Searching Authority issued in corresponding International Patent Application No. PCT/US2010/033393 dated Jul. 15, 2010 (12 pages).
International Preliminary Report on Patentability issued in corresponding International Patent Application No. PCT/US2010/033393 dated Oct. 19, 2011 (11 pages).
Office Action received in corresponding Japanese Patent Application No. 2012-509874 dated Nov. 9, 2012 (in Japanese with English translation attached) (10 pages).
Office Action received in corresponding Japanese Patent Application No. 2012-509874 dated Apr. 5, 2012 (in Japanese with English translation attached) (5 pages).

* cited by examiner

*Primary Examiner* — Zachary Wilkes
(74) *Attorney, Agent, or Firm* — Kilyk & Bowersox, P.L.L.C.

(57) ABSTRACT

Methods of making or providing ophthalmic lenses include using accommodative error measurements in the design or selection of one or more ophthalmic lenses. In some examples, the ophthalmic lenses are contact lenses.

18 Claims, No Drawings

USE OF ACCOMMODATIVE ERROR MEASUREMENTS IN PROVIDING OPHTHALMIC LENSES

This application is a National Stage Application of PCT/US2010/033393, filed May 3, 2010, and which claims the benefit under 35 U.S.C. §119(e) of prior U.S. Provisional Pat. application No. 61/175,233, filed May 4, 2009, which is incorporated in its entirety by reference herein.

FIELD

The present invention relates to methods of providing ophthalmic lenses, including contact lenses. In certain methods, the invention relates to methods of manufacturing ophthalmic lenses.

BACKGROUND

Contact lenses can be manufactured by techniques such as lathing, spin-cast molding, or static cast molding, or combinations thereof. Commonly, lens designs are selected to provide vision correction to patients or lens wearers based on the refractive needs of the patient. Design data is entered into a computer, and the computer can then use the data to provide instructions to one or more machines to form a lens with the desired design. A large number of lenses can be produced with different designs or parameters to satisfy the vision correction needs of a large number of people. The design of the lens may be achieved by directly lathing a polymerized material into the shape of a lens of a desired design, or it may be by forming a steel insert with a desired design that can then be used to shape a lens forming surface of a lens mold, which then transfers the design to the lens formed with the mold. Optical designs are typically based on surface curvatures, lens thickness profiles, and optic zone dimensions that are selected to provide refractive vision correction. Lens designs can be quickly tested for desirability by providing a contact lens to a patient who can then put the lens on his eye, and then measuring the visual acuity of the patient's eye with the lens in place. If the visual acuity is not acceptable, the lens design can be rejected, and a new design can be proposed.

Treatment of some visual conditions, however, does not occur as quickly as refractive vision correction or visual acuity correction. In other words, to test a lens design and its effect on such visual conditions, a substantial amount of time is required to observe whether a treatment effect is provided by the lens design. If the design is not acceptable, a significant time delay will have occurred before realizing that a particular design is not acceptable and determining how to design a new lens. For example, progression of myopia or myopia progression (e.g., the change of a person's vision from a first state to a more myopic second state) is a relatively slow process, compared to visual acuity correction. Myopia progression involves elongation of the eyeball and other physiological and physical changes. Due to the negative consequences associated with myopia progression and the development of severe myopia, reducing or preventing myopia progression is an important goal in ocular healthcare. To test whether a lens design is effective in reducing or preventing myopia progression, clinical studies are typically conducted with the lens design for several months or at least a few years to determine the lens' effectiveness on reducing myopia progression. These time scales are undesirable from a clinical and a manufacturing point of view, especially if the lens design did not reduce or prevent myopia progression, and a new design is to be tested.

SUMMARY

New methods of providing or manufacturing ophthalmic lenses have been invented. New methods of using ophthalmic lenses have also been invented. The present methods provide a reduced time to predict or determine whether a particular lens design will be effective in treating an ocular condition that requires more time than refractive vision correction diagnosis to determine if a treatment is successful. In some aspects, the present methods can be understood to relate to methods of optimizing ophthalmic lens designs. For example, with the present methods of producing or providing ophthalmic lenses, it is possible to accelerate the lens design stage in the development cycle of producing or manufacturing ophthalmic lenses. The ophthalmic lenses of the present invention can comprise contact lenses, spectacle lenses, trial lenses, the like, or combinations thereof. The ophthalmic lenses can be contact lenses, including hydrogel or silicone hydrogel contact lenses. The ophthalmic lenses can be spectacle lenses.

In one aspect, a method for providing an ophthalmic lens or providing ophthalmic lenses is described. The method comprises providing a first ophthalmic lens, and providing a second ophthalmic lens. As used herein, the words "a" or "an" mean one or more and are used interchangeably with the phrase "at least one. The first ophthalmic lens can be a spectacle lens or a contact lens. If the first ophthalmic lens is a contact lens, it can be worn by a person. If the ophthalmic lens is a spectacle lens, the spectacle lens can be provided in a frame. The second contact lens is to be worn by a person in need of vision therapy other than visual acuity correction. The first ophthalmic lens has a first lens design, and the second ophthalmic lens has a second lens design that is different from the first lens design. The second ophthalmic lens design is selected based on a measurement of accommodative error of the eye of the person wearing the first ophthalmic lens. Thus, the present methods are based on the invention that accommodative error measurements can be used in the selection of an ophthalmic lens from among a plurality of ophthalmic lenses of different parameters, in the design of ophthalmic lenses, and to accelerate the time in which new lens designs can be made and tested for ocular conditions other than visual acuity correction and that typically require long clinical studies to determine efficacy. As used herein, the term "second ophthalmic lens" is used in reference to the "first ophthalmic lens" for purposes of clarifying the order in which the ophthalmic lenses are provided to a wearer. In one example, when the ophthalmic lens is a spectacle lens or another type of lens other than a contact lens, the "second" ophthalmic lens can be a contact lens, and would therefore also be the first contact lens provided to the wearer. Aspects of the present invention are also described by the appended claims.

Various embodiments of the present invention are described in detail in the detailed description below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, and claims.

DETAILED DESCRIPTION

The present methods of providing ophthalmic lenses are effective in reducing the time required to select different ophthalmic lenses, or to design and test different ophthalmic lens designs for treatment of ocular conditions that typically require substantial amounts of time to determine clinical effectiveness. For example, the present methods can be used in the design of new ophthalmic lenses, including contact lenses, for treatment of myopia progression, such as by reducing or preventing myopia progression, or in other ocular conditions that require clinical testing times similar to myopia progression. Examples of other ocular conditions that may benefit by the new methods disclosed herein include reading performance, among other conditions. For example, by measuring accommodative error in a patient and selecting an ophthalmic lens based on the accommodative error measurements, it is possible to design the ophthalmic lens to reduce the accommodative error of the lens wearer, and thereby provide a method of improving reading performance, which improvements require more time to determine than measuring a reduction in accommodative error.

In reference to the present disclosure, a contact lens refers to a lens that is placed on the cornea of an eye. The contact lens can provide refractive vision correction to a lens wearer or patient in need of refractive vision correction. In addition or alternatively, the contact lens can provide a desired therapeutic effect other than refractive vision correction.

Ocular accommodation refers to an optical change in the power of the eye. Typically, ocular accommodation refers to the ability of the eye to change the refractive power of the eye's lens by changing the shape of the ocular lens. When a patient has no accommodative error, the patient does not have an accommodative lag or an accommodative lead. Accommodative lag is the amount by which the accommodative response of the eye is less than the dioptric stimulus to accommodation. Accommodative lead is the amount by which the accommodative response of the eye is greater than the dioptric stimulus to accommodation. Thus, as used herein, accommodative error refers to accommodative lag or accommodative lead, as understood by persons of ordinary skill in the art. Prior to becoming presbyopic, a person is able to sufficiently accommodate; however, a person's ability to accommodate deteriorates over time. The present methods are particularly useful in providing or producing contact lenses for people who can accommodate or who exhibit ocular accommodation, such as non-presbyopes. Presbyopia is most frequently diagnosed in people who are about forty years old or older. The present methods and uses are beneficial for patients, such as patients less than forty years old. The methods and uses can be useful in young adults, children, or both. For example, the present methods are effective for producing contact lenses for patients less than twenty-five years old.

To measure accommodative error, conventional equipment and methods may be used as understood by persons of ordinary skill in the art. For example, a retinoscope or a refractometer can be used to measure accommodative responses at different distances, such as at near, intermediate, or far target distances, as described herein. An example of a retinoscope that can be used is the ELITE retinoscope available from WelchAllyn (Skaneateles Falls, N.Y., USA) and an example of a refractometer that can be used is the WR-5100K available from Grand Seiko (Fukuyama, Japan). Additional retinoscopes that can be used are available from companies such as Keeler (Windsor, UK) and Heine (Herrsching, Germany). In a clinical setting, at least one accommodative error measurement is made at a near distance, such as 40 cm, and at least one accommodative error measurement is made at a far distance, such as 6 m (600 cm) or virtual infinity. Examples of targets that can be used to measure accommodative error include conventional eye charts, such as a Snellen eye chart, or a Maltese cross. Single accommodative error measurements can be made or multiple (e.g., more than one) accommodative error measurements can be made and averaged to provide an indication of the accommodative error for the patient's eye. Accommodation responses can be recorded for both eyes or for one eye, as desired. As is understood, since some aspects of ocular function are controlled by yoked muscles, frequently, accommodation is only measured in one eye. For example, an ophthalmic lens may be placed in close proximity to an eye of a patient. The accommodative error of the eye can be observed by measuring the accommodative error in the eye without the ophthalmic lens, but while the patient is viewing the target with the ophthalmic lens. An example of measurement of accommodation and accommodative error is described herein.

In practicing the present methods, an ophthalmic lens is provided. More specifically, a first ophthalmic lens is provided, and the first ophthalmic lens is to be worn by a person in need of vision therapy other than visual acuity correction. The first ophthalmic lens has a first lens design. Although the person or patient is in need of vision therapy other than visual acuity correction, some methods include providing a first ophthalmic lens to be worn by a person in need of vision therapy and in need of visual acuity correction. The first ophthalmic lens can be a first contact lens. As used herein, vision therapy refers to an ocular condition in which treatment efficacy of the condition is necessarily determined for a time greater than the time required to determine treatment efficacy of visual acuity. The clinical efficacy determination times can be at least fifteen minutes, at least six hours, at least twelve hours, at least twenty four hours, at least seven days, at least thirty days, at least three months, at least six months, or longer. Where the time is shorter, such as, for example about 15 minutes, the time is the time required to measure accommodative error, and any other optional measurements, and then selecting a second contact or other ophthalmic lens of a different lens design from a batch of a plurality of lenses. The time may be longer if additional steps are used, such as if the second ophthalmic lens is to be manufactured. In addition, for such vision therapy and ocular conditions, clinical studies are often used and can occur for several months or years in order to determine whether the effects provided by the contact lens are therapeutic. As used herein, therapeutic or treatment or the phrase "to treat" refers to the reduction or elimination of one or more symptoms associated with an ocular condition being treated.

As an example, the ocular condition subject to vision therapy is myopia progression. One goal of the therapy is to reduce or prevent myopia progression in the patient. One symptom associated with myopia progression is elongation of a patient's eyeball. Thus, the present lenses may successfully treat or provide a therapeutic effect to the patient if elongation of the patient's eyeball is eliminated or reduced compared to control values. Control values may refer to the predicted values for the patient given the patient's visual acuity, ocular health, genetic predisposition, environmental factors, or combinations thereof, among other things. The present lenses may be determined to successfully treat or provide a therapeutic effect if they can reduce or eliminate one or more other symptoms of the ocular condition as well.

The present methods comprise another step, in addition to providing the first ophthalmic lens having the first lens design. The other step of the present methods is making or providing a second ophthalmic lens to be worn by the person in need of vision therapy, and as described above. The second ophthalmic lens comprises a second lens design that is different than the first lens design. The ophthalmic lens has a second ophthalmic lens design that is selected based on a measurement of the accommodative error of the eye of the person wearing the first ophthalmic lens. Stated differently, the accommodative error of the person's eye, either without an ophthalmic lens disposed nearby or thereon, or with the first ophthalmic lens disposed nearby or thereon, is used as a factor in selecting a second ophthalmic lens having a different design than the first ophthalmic lens. The providing step can include a step of selecting the second ophthalmic lens from among a plurality of ophthalmic lenses having different designs or parameters based on the accommodative error measurement. Or, the method can comprise a step of making the second ophthalmic lens, as described herein, and providing the second ophthalmic lens.

As an example, the accommodative error of the patient with the first ophthalmic lens located near or on the patient's eye is measured by a measuring device, such as a refractometer or retinoscope. Conventional methods and equipment are used to measure accommodation and accommodative error, as understood by persons of ordinary skill in the art. The accommodative error of the patient is typically measured by an optician, such as an optometrist or ophthalmologist, using the measuring device. The accommodative error measured by the optician can be stored in a computer as data. The accommodative error data can then be used by an ophthalmic lens manufacturer or a lens designer as a factor in designing at least one more different ophthalmic lens, such as a second ophthalmic lens. For example, a lens manufacturer or lens designer can receive the accommodative error data for one patient or for many patients from the optician or other data supplier. The accommodative error data can then be used by one or more computer programs or by a lens designer as an element influencing the design of the second ophthalmic lens. As one example, by conducting multiple studies with different lens designs during the development of contact lenses in accordance with the present description, a correlation can be obtained that provides a relationship between accommodative error measurements and different contact lens properties, such as optical zone dimensions, such as optic zone diameter, such as aberration profiles, or other optical profiles. Then, in accordance with the present methods, a lens designer, for example, can receive an accommodative error value of a patient, and compare the accommodative error for that patient to the previously developed correlation, and select a lens design that will correct the patient's accommodative error. In practicing the present methods, it is not necessary for the lens designer or lens manufacturer to actually measure the accommodative error of the patient, however, the present methods can comprise a step of measuring the accommodative error of the person or patient. In the alternative or in addition, the accommodative error measurement of data can be used in a step of selecting the second ophthalmic lens from a batch of a plurality of ophthalmic lenses or from among a plurality of ophthalmic lenses. Additional methods may comprise an additional step or steps of manufacturing, designing, or selecting one or more additional ophthalmic lenses in addition to the second ophthalmic lens.

In view of the foregoing, it can be understood that a broad aspect of the present methods relates to the use of accommodative error measurements in the providing of ophthalmic lenses, in the design of ophthalmic lenses, in the manufacture of ophthalmic lenses, or combinations thereof. It can also be appreciated that aspects of the present methods relate to the use of accommodative error measurements to optimize ophthalmic lens designs. Benefits in manufacturing, designing, and/or testing new lens designs can be achieved by the relatively short time required to measure accommodative error.

By measuring accommodative error, not only can one reduce the time required to manufacture and test a new lens design, but also, one can use accommodative error measurements to predict whether the ophthalmic lens design will provide successful treatment or vision therapy to the patient, other than visual acuity correction. Thus, it can be understood that the present methods are effective in producing an ophthalmic lens useful in the treatment of myopia progression of an eye of a person.

In more detail, the second ophthalmic lens can be provided by analyzing an accommodative lead measurement or analyzing an accommodative lag measurement of the eye of the person wearing the first ophthalmic lens. As stated above, the analysis can be performed with a computer program, either software code, hardware code, or both, or can be performed manually. The analysis can provide a prediction as to whether the second lens with the second lens design will provide effective or better treatment of the ocular condition to be treated. This can be accomplished by comparing the accommodative error to a previously generated correlation between accommodative error and one or more contact lens properties, as described herein. The second lens can be selected to reduce the accommodative lag of the patient, or even provide some accommodative lead to the patient.

The present methods reduce the amount of time required to determine efficacy of new lens designs. The first ophthalmic lens can be evaluated on or near the person's eye, such as by measuring accommodative error, and the second ophthalmic lens can be made and tested on the person's eye within six months of when the first ophthalmic lens is evaluated. The second ophthalmic lens can be tested within 15 minutes of when the first ophthalmic lens is evaluated. The evaluations can be performed by an optician or opticians using conventional ophthalmic lens evaluation techniques and ocular testing, such as accommodative error measurements and the like. The time between the initial evaluation and subsequent evaluation can vary and be shorter or longer than six months, as described herein. The second ophthalmic lens can be made and tested on the person's eye within one month of when the first ophthalmic lens is evaluated near or on the person's eye.

One aim of the present methods is to use accommodative error measurements, either accommodative lead or accommodative lag measurements, as predictors for future success of new ophthalmic lens designs in vision therapy other than visual acuity correction. The second ophthalmic lens design, or additional ophthalmic lens design, is selected if the accommodative error with the second ophthalmic lens or the additional ophthalmic lens is less than 1.5 diopters. That is, the accommodative error can be less than +1.5 diopters or greater than −1.5 diopters. For example, the present methods can include selecting the second lens design if the accommodative error is less than 1.0 diopters, less than 0.8 diopters, less than 0.6 diopters, less than 0.4 diopters, less than 0.2 diopters, or if the accommodative error is about 0.0 diopters.

In the present methods, such as where the ophthalmic lenses are used to reduce or prevent myopia progression, each of the first ophthalmic lens and the second ophthalmic lens can comprise a clear vision region having a first refractive power, and a myopic defocus region having a second refractive power. The second refractive power of the myopic defocus region is typically more positive or less negative than the first refractive power (e.g., at least 0.5 diopters more positive than the first refractive power, and frequently less than 6.0 diopters more positive than the first refractive power). The refractive power of the myopic defocus region can be a negative diopter, zero diopters, or a positive diopter. The refractive power of the clear vision region can have a value from about 0 diopters to about −10.0 diopters. The vision correction region can comprise a spherical power, a cylindrical power, or both a spherical power and a cylindrical power. The refractive power of the vision correction region of the ophthalmic lens can be provided by a spherical lens surface curvature or an aspherical lens surface curvature, or combinations thereof. As used herein, the vision correction region of the ophthalmic lens when measured by a vertometer or focimeter, as used in contact lens manufacturing environments, may appear to have a single refractive power. However, the vision correction region may also have aspheric surfaces that provide more than one refractive power to the vision correction region, but where the lens still has an effective single refractive power. In one example of such an embodiment, at least one of the first ophthalmic lens and the second ophthalmic lens comprises a contact lens.

The myopic defocus region is structured (sized, shaped, or sized and shaped) to provide a defocused image to the patient while viewing at near and at far viewing distances while the patient is provided with clear vision by the clear vision region, that is, the region with more negative optical power than the myopic defocus region. As used herein, myopic defocus refers to a defocused image formed in front of the retina by an ophthalmic lens. The myopic defocus can be understood to be positive in that the defocused image created by the ophthalmic lens is located anterior to the retina of the eye upon which the ophthalmic lens is acting. As used herein, clear vision or clear visual acuity is typically determined by an optician providing a visual acuity test, such as by using a standard letter chart. For the purposes of this disclosure, clear vision or clear visual acuity can mean that a lens wearer has a vision score from about 20/40 to about 20/10 when wearing the present contact lenses and when viewing far target distances, such as a target distance of 600 cm.

Significantly, in embodiments wherein the at least one of the ophthalmic lenses comprises a contact lens, since the patient provided with the present contact lens or lenses uses the clear vision region to see clearly at near and far distances, the myopic defocus region is not used by the patient to provide clear vision at near distances (in contrast to the near vision zone of commercially available bifocal contact lenses) and instead, the myopic defocus region is effective in providing a defocused imaged to the patient at both near and far distances.

If the person for which the ophthalmic lens is to be worn is an emmetrope predisposed to becoming myopic, the clear vision region may have a first refractive power of 0.0 diopters. If the person for which the ophthalmic lens is to be worn is a myope, the clear vision region may be a distance vision region and have a first refractive power that is more negative than 0.0 diopters. For example, the first refractive power may be from −0.25 diopters to about −10.0 diopters. If the clear vision region of the ophthalmic lens has a refractive power to correct the patient's distance visual acuity of the eye, the clear vision region of the ophthalmic lens can be understood to have a distance optical power, a distance power, or a distance vision power. This is in comparison to a refractive power that corrects a near visual acuity of the eye, or a region that has a near optical power, near power, or near vision power. The clear vision region of embodiments of the present lenses is structured (sized, shaped, or both sized and shaped) to provide clear vision to the patient at both near and far viewing distances.

As used herein, a near distance refers to a viewing distance in which the target being viewed is about 60 cm or less from the patient. The viewing distance may also be referred to as a target distance. Examples of near viewing distances include about 50 cm, about 40 cm, about 35 cm, and about 25 cm. Frequently, near visual acuity is measured at about 40 cm. As used herein, a far distance refers to a viewing distance or target distance in which the target being viewed is at least 400 cm. Examples of far viewing distances include at least 400 cm, at least 500 cm, and at least 600 cm. As used herein, an intermediate viewing distance refers to a distance between a near viewing distance and a far viewing distance. For example, an intermediate viewing distance refers to a distance of from about 60 cm to about 400 cm, and includes as an example, about 80 cm, about 100 cm, about 120 cm, and about 140 cm.

The clear vision region of the ophthalmic lens provides clear vision to the lens wearer at both near viewing distances and at far viewing distances. In comparison, conventional bifocal contact lenses are designed with specific near and specific distance zone sizes such that a lens wearer will use the distance zone for viewing far distances, and will use the near zone for viewing near distances.

In the present methods, the clear vision region of the contact lens can comprise a central circular zone that includes the optic axis of the contact lens, and the myopic defocus region is provided in an annular zone circumscribing the central circular zone. The myopic defocus region may define the entire annular zone or the annular zone may comprise a plurality of annular sub-zones, at least one of which has a refractive power to provide myopic defocus when the person wearing the lens is viewing at near distances and at far distances.

In any of the foregoing methods, the methods can provide a contact lens with a clear vision region having a first area, and a myopic defocus region having a second area. The making step of the second contact lens in these methods comprises changing the first area, the second area, or both of the lens design of the first contact lens. Stated differently, the first contact lens has a lens design in which each of the areas has a certain value. The second contact lens is made by changing at least one of the areas of the first contact lens to be a new lens design of the second contact lens.

In any of the present methods, the providing step of the methods may comprise providing the ophthalmic lens to a lens distributor, providing a lens to an optician, such as an optometrist or ophthalmologist, or providing the lens to the patient, or any combinations thereof. The present methods are directed at a lens manufacturer providing ophthalmic lenses to lens distributors, such as lens retailers, who may then provide the lenses to opticians or patients. The present methods can be directed at a lens manufacturer or a lens distributor providing ophthalmic lenses to opticians. The methods can be directed at opticians providing the lenses to patients, and instructing the patients on how to wear the lenses.

In any of the present methods, the providing step may comprise providing at least one pair of the first lenses, that is, lenses having the first lens design. When the lenses are contact lenses, the providing can comprise providing a first box of lenses, or providing a first box and a second box of lenses. Other lenses, such as the second lenses, may also be provided in pairs, or sets of more than two lenses.

The making step of any of the present methods may comprise cast molding a polymerizable composition into the shape of a contact lens, separating the cast molded contact lens from a contact lens mold member, contacting the separated cast molded contact lens with a liquid, inspecting the separated cast molded contact lens, packaging the separated cast molded contact lens in a contact lens package, sterilizing the contact lens in the package, or combinations thereof.

One method of forming a cast molded contact lens is as follows. First and second mold members are produced. The first and second mold members are structured to be coupled together to form a contact lens mold assembly. The first mold member is a front surface mold member, and it includes a concave lens forming surface which will form the front surface of the contact lens. The second mold member is a back surface mold member, and it includes a convex lens forming surface which will form the back surface of the contact lens. The first mold member is produced to include one or more surface curvatures on its concave surface. The surface curvatures are dimensioned to provide a clear vision region and a myopic defocus region as described herein. A polymerizable composition is produced and includes reactive ingredients, and optionally non-reactive ingredients, used in forming contact lenses. The ingredients can include one or more hydrophilic monomers, oligomers, macromers, or polymers; one or more hydrophobic monomers, oligomers, macromers, or polymers; one or more silicone-containing monomers, oligomers, macromers, or polymers; or combinations thereof. The polymerizable composition is dispensed onto the concave surface of the first mold member. The second mold member is placed against the first mold member to form a contact lens mold assembly having a contact lens shaped cavity with the polymerizable composition located therein. The contact lens mold assembly is then exposed to heat or light to polymerize the polymerizable composition and form a polymerized contact lens product. The contact lens mold assembly is demolded by separating the first and second mold members. The polymerized contact lens product remains attached to the first or the second mold member, and is then delensed or separated from the mold member. The delensed contact lens is contacted with a liquid, which may be a washing liquid, or it may be a packaging liquid. The washing liquid can include one or more agents to help extract unreacted or partially reacted ingredients from the delensed contact lens product. Methods can include one or more steps of inspecting the lens in a dry state, a wet state, or both. The inspection can include inspecting for defects or inspecting for quality control purposes. Once the lenses are placed in a packaging liquid, the packages can be sealed, and sterilized.

The making step of the methods can comprise designing the second contact lens to have a lens design that provides an amount of myopic defocus, wherein the amount of defocus is based on the accommodative error of the eye of the person. In an example, the making step of the methods can comprise designing the second contact lens to have a lens design that provides an amount of myopic defocus that differs from an amount of myopic defocus of the first lens design by a number of diopters equal to the accommodative error of the eye of the person.

In any of the present methods, the making step can comprise designing the second contact lens to have a lens design having a myopic defocus region that has an area effective in reducing the accommodative error of the eye without the second lens by at least 10%. Examples include making the second lens to have a lens design that reduces the accommodative error by at least 20%, at least 40%, or by at least 60%, or by at least 80%, or at least by 100%. If the accommodative error is an accommodative lag, and the error reduction in accommodative lag is greater than 100%, the eye is experiencing accommodative lead.

The present methods may further comprise one or more additional steps of making at least a third contact lens to be worn by a person, wherein the third contact lens comprises a third lens design that is different from the first lens design, the second lens design, or both. Additional methods can include making a fourth, a fifth, a sixth, or more contact lenses until the optimum lens design is selected.

The present contact lenses provided in the present methods can be soft contact lenses, that is, they are contact lenses that have a flexibility to substantially conform to the shape of an eye of a lens wearer when placed on the lens wearer's eye. Typically, soft contact lenses are referred to as hydrogel contact lenses, as compared to rigid gas permeable contact lenses. As used herein, a hydrogel contact lens refers to a polymeric lens that has the ability to absorb and retain water in an equilibrium state. In the context of the present description, a hydrogel lens can be polymeric material that is free of a silicone-containing component, or a hydrogel lens can be a polymeric material that includes a silicone-containing component. Many silicone-free hydrogel contact lenses are based on polymerizable lens formulations that include hydroxyethyl methacrylate (HEMA) monomers. Some examples of hydrogel contact lens materials include materials having the following US Adopted Names (USANs): etafilcon A, nelfilcon A, ocufilcon A, ocufilcon B, ocufilcon C, ocufilcon D, and omafilcon A. In addition, the present contact lenses may be hydrogel contact lenses that are based on lens formulations that contain glyceryl methacrylate (GMA) alone or in combination with HEMA. Silicone-containing hydrogel contact lenses are frequently referred to as silicone hydrogel contact lenses. Many silicone hydrogel contact lenses are based on polymerizable lens formulations that include siloxane monomers, oligomers, or macromers. Some examples of silicone hydrogel contact lens materials include materials having the following USANs: acquafilcon A or aquafilcon A, balafilcon A, comfilcon A, enfilcon A, galyfilcon A, lenefilcon A, lotrafilcon A, lotrafilcon B, and senofilcon A.

The present contact lenses may be the polymerized reaction product of a polymerizable composition that comprises one or more hydrophilic monomers, one or more hydrophobic monomers, one or more silicone-containing monomers, oligomers, or macromers, one or more polymers, or combinations thereof. In addition, the polymerizable compositions used to make the present lenses may include crosslinking agents, free radical initiators, tinting agents, UV absorbers, and the like. The present soft contact lenses may comprise, consist essentially of, or consist of, any of the foregoing contact lens materials identified by the USAN names above. The present lenses can be made from omafilcon A. The present lenses can be silicone hydrogel contact lenses and can be made from comfilcon A or enfilcon A.

The present contact lenses can be molded contact lenses, such as spin-cast molded or cast molded contact lenses, or lathed contact lenses. It can be appreciated that these types of contact lenses can have different physical features resulting from their method of manufacture. A cast molded contact lens refers to a contact lens obtained from a contact lens mold assembly formed from two contact lens mold sections in contact with each other to form a contact lens shaped cavity. In addition, a portion of the present contact lenses can be polished or smoothed after forming the contact lens. For example, a contact lens that has been cast molded or lathed, or both, can be polished to reduce transition areas or improve edge shapes to provide greater comfort compared to unpolished lenses.

The present contact lenses can be daily wear lenses or extended wear lenses. As used herein, an extended wear contact lens refers to a contact lens that is approved for wearing on a continuous basis for more than 24 hours. Each contact lens of the lens pair can be a daily disposable contact lens (i.e., a contact lens that is worn on a person's eye only once and then discarded). In comparison, as understood by persons of ordinary skill in the art, a daily wear lens is a lens that is worn on a person's eye, and is then cleaned and is worn on the person's eye for at least one additional time. It can be appreciated that daily disposable contact lenses can be physically different, chemically different, or both compared to daily wear and extended wear contact lenses. For example, formulations used to make daily wear or extended wear contact lenses are different than formulations used to make daily disposable contact lenses due to the economic and commercial factors in making substantially larger volumes of daily disposable contact lenses.

The present contact lenses are placed on a patient's eye such that the posterior surface of the lens faces the corneal epithelium of the eye of the patient.

Aspects of the present methods may be further understood by consideration of the following example:

EXAMPLE 1

A hydrogel contact lens is a cast molded contact lens made from omafilcon A as described in the description above. The contact lens has a central circular zone having distance optical power. The diameter of the central zone of the hydrated contact lens is about 3.3 mm, and the central zone has a refractive power of −3.00 diopters. The contact lens has an annular zone surrounding the central circular zone. The annular zone comprises a plurality of rings of differing refractive powers. Some of the rings are provided with a refractive power of −1.00 diopters, and at least one of the rings is provided with a refractive power of −3.00 diopters. The −3.00 diopter zones define the clear vision region or distance vision and near vision region of the lens. The −1.00 diopter zones define the myopic defocus region of the lens. The ratio in area of the clear vision region to the myopic defocus region is about 1:1. In other words, about 50% of the refractive power is from the clear vision region, and about 50% of the refractive power is from the myopic defocus region.

Accommodative error measurements of a 10 year old myope are recorded. Measurements are made with a refractometer at a target distance of 40 cm. The patient is provided with the hydrogel contact lens described in the preceding paragraph. The accommodative error at 40 cm with the contact lens is −0.4 diopters.

A lens designer receives the accommodative error measurement of −0.5 diopters from an optician. The lens designer designs a second lens using this −0.5 diopter accommodative error as a factor of the lens design. The second contact lens is designed by changing the relative area of the clear vision region to the myopic defocus region such that the accommodative error of the patient's eye should be reduced by at least 0.25 diopters when wearing the second lens, compared to the first lens. Thus, the accommodative error should be −0.25 diopters or 0 diopters. The second lens is cast molded as described herein.

Within two weeks from the evaluation of the first lens, the myopic patient is fitted with the second lens and accommodative error measurements are made. The accommodative error for the eye with the second contact lens is −0.25 diopters.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

What is claimed is:

1. A method for providing an ophthalmic lens based on an accommodation error measurement, comprising steps of:
   providing a first ophthalmic lens to be worn by a person in need of vision therapy other than visual acuity correction, the first ophthalmic lens having a first lens design;
   providing a second ophthalmic lens to be worn by the person for the same eye as the first ophthalmic lens, the second ophthalmic lens comprising a second lens design different than the first lens design, the second ophthalmic lens design being selected based on a measurement of accommodative error of the eye of the person wearing the first ophthalmic lens.

2. The method of claim 1, wherein the method further comprises the step of making the second ophthalmic lens.

3. The method of claim 1, wherein the method is effective in producing a contact lens useful in the treatment of myopia progression of an eye of the person.

4. The method of claim 2, wherein the second ophthalmic lens is made based on at least an accommodative lag measurement of the eye of the person wearing the first contact ophthalmic lens.

5. The method of claim 1, wherein the method further comprises the steps of evaluating the first ophthalmic lens on the person's eye, and providing and testing the second ophthalmic lens on the person's eye within six months of when the first ophthalmic lens is evaluated on the person's eye.

6. The method of claim 5, wherein the second ophthalmic lens is made and is tested on the person's eye within one month of when the first ophthalmic lens is evaluated on the person's eye.

7. The method of claim 1, wherein the second ophthalmic lens design is selected to obtain an accommodative error that is less than 1.5 diopters.

8. The method of claim 1, wherein each of the first ophthalmic lens and the second ophthalmic lens comprise a clear vision region having a first refractive power and a myopic defocus region having a second refractive power that is more positive than the first refractive power.

9. The method of claim 8, wherein the clear vision region comprises a central circular zone including the optic axis of the ophthalmic lens, and the myopic defocus region is provided in an annular zone circumscribing the central circular zone.

10. The method of claim 8, wherein the clear vision region has a first area, and the myopic defocus region has a second area, wherein the making of the second ophthalmic lens comprises changing the first area, the second area, or both of the lens design of the first ophthalmic lens.

11. The method of claim 1, wherein the step of providing the second ophthalmic lens comprises providing the lens to a lens distributor, providing the lens to an optician, providing the lens to the patient, or combinations thereof.

12. The method of claim 1, wherein the step of providing the second ophthalmic lens comprises providing a pair of first lenses.

13. The method of claim 1, wherein the step of providing the second ophthalmic lens comprises cast molding a polymerizable composition into the shape of a contact lens, separating the cast molded contact lens from a contact lens mold member, contacting the separated cast molded contact lens with a liquid, inspecting the separated cast molded contact lens, packaging the separated cast molded contact lens in a contact lens package, or sterilizing the contact lens in the package, or combinations thereof.

14. The method of claim 1, wherein the step of providing the second ophthalmic lens comprises designing the second ophthalmic lens to have a lens design that provides an amount of myopic defocus that differs from an amount of myopic defocus of the first lens design by a number of diopters equal to about the accommodative error of the eye of the person when wearing the first ophthalmic lens.

15. The method of claim 1, wherein the step of providing the second ophthalmic lens comprises designing the second ophthalmic lens to have a lens design including a myopic defocus region having an area effective in reducing the accommodative error of the eye without the second lens by at least 10% at a target distance of about 40 cm.

16. The method of claim 1, further comprising the step of providing at least a third ophthalmic lens to be worn by a person, the third ophthalmic lens comprising a third lens design different from the first lens design, or the second lens design, or both the first lens design and the second lens design.

17. The method of claim 1, wherein the step of providing the second ophthalmic lens comprises providing a hydrogel contact lens.

18. The method of claim 17, wherein the hydrogel contact lens is a silicone hydrogel contact lens.

\* \* \* \* \*